United States Patent
Wittbold et al.

(10) Patent No.: US 7,718,019 B2
(45) Date of Patent: May 18, 2010

(54) METHODS OF AND SYSTEMS FOR PREPARING A HEAT RESISTANT ACCELERANT SLURRY AND ADDING THE ACCELERANT SLURRY TO A POST-MIXER AQUEOUS DISPERSION OF CALCINED GYPSUM

(75) Inventors: James R. Wittbold, Des Plaines, IL (US); Brent Groza, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 829 days.

(21) Appl. No.: 11/116,549

(22) Filed: Apr. 27, 2005

(65) Prior Publication Data

US 2006/0244182 A1 Nov. 2, 2006

(51) Int. Cl.
| | |
|---|---|
| B29C 65/00 | (2006.01) |
| B32B 13/00 | (2006.01) |
| B32B 37/00 | (2006.01) |
| B32B 1/00 | (2006.01) |
| B32B 29/00 | (2006.01) |
| B32B 3/18 | (2006.01) |
| B32B 5/20 | (2006.01) |
| C04B 9/04 | (2006.01) |
| C04B 11/00 | (2006.01) |
| C04B 28/14 | (2006.01) |
| H05B 6/00 | (2006.01) |

(52) U.S. Cl. .............. 156/39; 156/40; 156/42; 156/43; 106/772; 106/776; 264/426

(58) Field of Classification Search ............... 106/772, 106/776; 156/39, 40, 42, 43; 264/426
See application file for complete search history.

(56) References Cited

U.S. PATENT DOCUMENTS

| 624,687 A | 5/1899 | Sackett |
| 1,489,693 A | 4/1924 | Brookby |
| 1,500,452 A | 7/1924 | Haggerty |
| 1,620,067 A | 3/1927 | Brookby et al. |

(Continued)

FOREIGN PATENT DOCUMENTS

CL 1895-98 3/1999

(Continued)

OTHER PUBLICATIONS

"Tank Mixing Edcutors", Jul. 10, 2004 http://web.archive.org/web/20040710154052/http://troop906.219.com/website/vendors/Eductors/mixing_eductors.htm.*

(Continued)

*Primary Examiner*—Philip C Tucker
*Assistant Examiner*—Michael N Orlando
(74) *Attorney, Agent, or Firm*—Leydig, Voit & Mayer, Ltd.; Philip T. Petti; David F. Janci

(57) ABSTRACT

Methods and systems are provided for preparing a heat resistance accelerator (HRA) slurry. Also provided are methods and systems for introducing a HRA slurry to an aqueous dispersion of calcined gypsum in a discharge apparatus downstream of a stucco mixer in which the dispersion was prepared. These methods and systems are useful in the production of various gypsum products such as board including wallboard and ceiling tiles.

35 Claims, 8 Drawing Sheets

U.S. PATENT DOCUMENTS

| | | | |
|---|---|---|---|
| RE16,860 E | 1/1928 | Armstrong |
| 1,719,726 A | 7/1929 | Raynes |
| 1,733,741 A | 10/1929 | Lovett |
| 1,758,200 A | 5/1930 | Pfeffer et al. |
| 1,764,824 A | 6/1930 | Brookby et al. |
| 1,767,791 A | 6/1930 | Gough et al. |
| 1,813,828 A | 7/1931 | Turner et al. |
| 2,079,565 A | 5/1937 | Roos et al. |
| 2,089,087 A | 8/1937 | Fletcher |
| 2,097,088 A | 10/1937 | Mills |
| 2,207,339 A | 7/1940 | Camp |
| 2,220,683 A | 11/1940 | Knode |
| 2,220,684 A | 11/1940 | Knode et al. |
| 2,253,059 A | 8/1941 | Camp |
| 2,301,597 A | 11/1942 | Welty et al. |
| 2,346,999 A | 4/1944 | Briscoe et al. |
| 2,512,163 A | 6/1950 | Mallory |
| 2,538,891 A | 1/1951 | Zimmerman et al. |
| 2,574,238 A | 11/1951 | Bean et al. |
| 2,625,381 A | 1/1953 | Zimmerman et al. |
| 2,639,901 A | 5/1953 | Teale |
| 2,641,453 A | 6/1953 | Teale |
| 2,660,416 A | 11/1953 | Camp et al. |
| 2,762,738 A | 11/1956 | Teale |
| 2,862,829 A | 12/1958 | Dixon et al. |
| 2,985,219 A | 5/1961 | Summerfield |
| 3,173,663 A | 3/1965 | Schoonover |
| 3,262,799 A | 7/1966 | McCleary et al. |
| 3,343,818 A | 9/1967 | Plemons et al. |
| 3,359,146 A | 12/1967 | Lane et al. |
| 3,459,620 A | 8/1969 | McCleary et al. |
| 3,573,947 A | 4/1971 | Kinkade et al. |
| 3,666,581 A | 5/1972 | Lane et al. |
| 3,947,285 A | 3/1976 | Jones et al. |
| 4,009,062 A | 2/1977 | Long |
| 4,054,461 A | 10/1977 | Martin |
| 4,176,972 A | 12/1979 | Stiling |
| 4,183,908 A | 1/1980 | Rolfe |
| 4,184,771 A | 1/1980 | Day |
| 4,279,673 A | 7/1981 | White et al. |
| 4,288,263 A | 9/1981 | Delcoigne et al. |
| 4,354,885 A | 10/1982 | White |
| 4,364,790 A | 12/1982 | Delcoigne et al. |
| 4,612,766 A | 9/1986 | Eder |
| 4,812,045 A | 3/1989 | Rivers |
| 4,820,053 A | 4/1989 | Rivers |
| 4,995,729 A | 2/1991 | Eberhardt et al. |
| 5,071,257 A | 12/1991 | Hasenpath et al. |
| 5,286,425 A | 2/1994 | Babcock et al. |
| 5,366,547 A | 11/1994 | Brabston et al. |
| 5,560,774 A | 10/1996 | Burge et al. |
| 5,643,510 A | 7/1997 | Sucech |
| 5,683,635 A | 11/1997 | Sucech et al. |
| 5,714,032 A | 2/1998 | Ainsley et al. |
| 5,718,797 A | 2/1998 | Phillips et al. |
| 6,019,919 A | 2/2000 | Sulzbach et al. |
| 6,036,740 A | 3/2000 | Miller et al. |
| 6,059,444 A | 5/2000 | Johnson et al. |
| 6,158,677 A | 12/2000 | Coles |
| 6,193,408 B1 | 2/2001 | Miura et al. |
| 6,342,284 B1 * | 1/2002 | Yu et al. ............. 428/70 |
| 6,379,458 B1 | 4/2002 | Immordino et al. |
| 6,409,824 B1 | 6/2002 | Veeramasuneni et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,800,131 B2 | 10/2004 | Yu et al. |
| 6,874,930 B2 | 4/2005 | Wittbold et al. |
| 2003/0117891 A1 | 6/2003 | Wittbold et al. |

FOREIGN PATENT DOCUMENTS

| | | |
|---|---|---|
| CL | 318-99 | 7/1999 |
| CL | 977-02 | 2/2003 |
| CL | 740-06 | 6/2006 |
| CL | 741-06 | 6/2006 |
| FR | 2 824 552 | 11/2002 |
| KZ | 19573 A | 6/2008 |
| KZ | 21158 A | 5/2009 |
| SU | 132520 A1 | 11/1960 |
| SU | 1426959 A1 | 9/1988 |
| WO | WO 95/28229 A1 | 10/1995 |
| WO | WO 99/08979 A1 | 2/1999 |
| WO | WO 00/06518 A1 | 2/2000 |
| WO | WO 02/098646 A1 | 12/2002 |
| WO | WO 2005/091819 A2 | 10/2005 |
| WO | WO 2005/092583 A1 | 10/2005 |
| WO | WO 2006/115496 | 11/2006 |

OTHER PUBLICATIONS

Fox Valve Development Corp., "Fox Slurry Eductors," www.foxvalve.com/main.html (accessed Apr. 26, 2005).
U.S. Appl. No. 11/116,809, filed Apr. 27, 2005, Wittbold et al.
U.S. Appl. No. 11/116,550, filed Apr. 27, 2005, Yu et al.
Beretka et al., "Studies on the Reactivity and Physical Properties of Calcined Gypsum as a Function of Time and Temperature," (1983).
Jyoti Ceramic Inds. P. Ltd., *Zirconox Micro Milling Beads with Macro Grinding and Dispersion Capabilities,* Product Brochure (dated at least Oct. 7, 2003).
Lane et al., *Ceramic Bulletin,* 54 (3), 291-294 & 303 (1975).
U.S. Appl. No. 08/916,058, filed Aug. 21, 1997, Yu et al.

* cited by examiner

METHODS OF AND SYSTEMS FOR PREPARING A HEAT RESISTANT ACCELERANT SLURRY AND ADDING THE ACCELERANT SLURRY TO A POST-MIXER AQUEOUS DISPERSION OF CALCINED GYPSUM

BACKGROUND OF THE INVENTION

Set gypsum, which comprises calcium sulfate dihydrate, is a well-known material that is included commonly in many types of products, such as gypsum boards employed in typical drywall construction of interior walls and ceilings of buildings. Typically, such gypsum-containing board is prepared by forming a mixture of calcined gypsum, that is, calcium sulfate hemihydrate and/or calcium sulfate anhydrite, and water, as well as other components, as desired. The mixture typically is cast into a pre-determined shape on the surface of a conveyor or in a tray. As it travels along the conveyor, the calcined gypsum reacts with water to form a matrix of crystalline hydrated gypsum or calcium sulfate dihydrate. The desired hydration of the calcined gypsum is what enables the formation of an interlocking matrix of set gypsum crystals, thereby imparting strength to the gypsum structure in the gypsum-containing product. Mild heating can be used to drive off unreacted water to yield a dry product. Gypsum mixers and methods of producing gypsum products are described, for example, in U.S. Pat. Nos: 1,767,791; 2,253,059; 2,346,999; 4,183,908, 5,683,635; 5,714,032; and 6,494,609.

Accelerator materials are commonly used in the production of gypsum products to enhance the efficiency of hydration and to control set time. Accelerators are described, for example in U.S. Pat. Nos: 3,573,947; 3,947,285; 4,054,461; and 6,409,825. Some accelerators include finely ground dry calcium sulfate dihydrate, commonly referred to as "gypsum seeds." The gypsum seeds enhance nucleation of the set gypsum crystals, thereby increasing the crystallization rate thereof. Traditionally, accelerators have been added to the same mixer chamber as that used to combine water with calcined gypsum. While addition of accelerator to the mixer has the advantage of mixing the accelerator well and evenly throughout the water and calcined gypsum mixture, the accelerator can also cause the gypsum to begin setting prematurely. This premature setting causes the mixer to clog, can cause damage to the mixer, limits efficiency, and necessitates more frequent mixer cleaning. Mixer cleaning requires shutting down a board line with a serious detriment to productivity. Although additives including retarders have been used in the mixer to combat premature setting, such additives contribute additional costs and considerations.

Conventional gypsum seed accelerator materials progressively lose their effectiveness upon aging, even under normal conditions. In this respect, some efficiency of the accelerator is lost even as it is ground, and the gypsum seeds dramatically lose potency over time during handling or storage. The loss of acceleration efficiency of conventional accelerator materials is exacerbated when the accelerator is exposed to heat and/or moisture. To combat the loss of efficiency of the gypsum seeds over time, particularly under conditions of heat, it is customary to coat the calcium sulfate dihydrate accelerator material with any of a number of known coating agents, such as, for example, sugars, including sucrose, dextrose and the like, starch, boric acid, or long chained fatty carboxylic acids including salts thereof. Conventional heat resistant accelerator materials are both ground and provided in dry form inasmuch as accelerator loses efficiency upon contact with moisture, for example, because the accelerator particles undesirably agglomerate and/or because the coating agents often are soluble in water.

New materials and methods are needed to overcome the deficiencies of heat resistant accelerator that still preserve the benefits of using such an accelerator.

BRIEF SUMMARY OF THE INVENTION

According to one aspect of the present invention, a method of preparing a heat resistant accelerant slurry and introducing the slurry into a post-mixer aqueous dispersion of calcined gypsum in a discharge apparatus is provided. A heat resistant accelerator (HRA) is added into a first mixing device. A liquid medium is added into the first mixing device. The HRA and liquid medium are mixed in the first mixing device to form the HRA slurry. The aqueous dispersion of calcined gypsum is formed in a second mixing device. The aqueous dispersion is discharged from the second mixing device into a discharge apparatus. The HRA slurry is transferred from the first mixing device into the discharge apparatus.

According to another aspect of the present invention, a method is provided for introducing a heat resistant accelerator (HRA) slurry into a post-mixer aqueous dispersion of calcined gypsum in a discharge apparatus. The aqueous dispersion is discharged from the second mixing device into a discharge apparatus. The HRA slurry is introduced into the discharge apparatus.

A system for forming a heat resistant accelerant (HRA) slurry and adding the slurry to a post-mixer aqueous dispersion of calcined gypsum is provided as an aspect of the present invention. The system comprises a source of HRA; a source of liquid medium; a first mixing device; the sources operatively associated with the first mixing device; a second mixing device; a discharge apparatus operatively associated with an outlet of the second mixing device; a delivery device; the first mixing device and the discharge apparatus operatively associated with the delivery device.

For example, the present invention has particular utility in the preparation of gypsum board such as wallboard or ceiling tile. In such embodiments, after the HRA slurry is added to the aqueous dispersion of calcined gypsum, the dispersion is deposited onto a moving coversheet. In the case of wallboard, a second coversheet is applied to the deposited contents prior to drying. In some embodiments, such as some ceiling tile, a second coversheet is not employed.

The present invention's methods, systems, and elements thereof are further described in the drawings and detailed description, which provide representative embodiments.

BRIEF DESCRIPTION OF THE SEVERAL VIEWS OF THE DRAWING(S)

Figure 1:
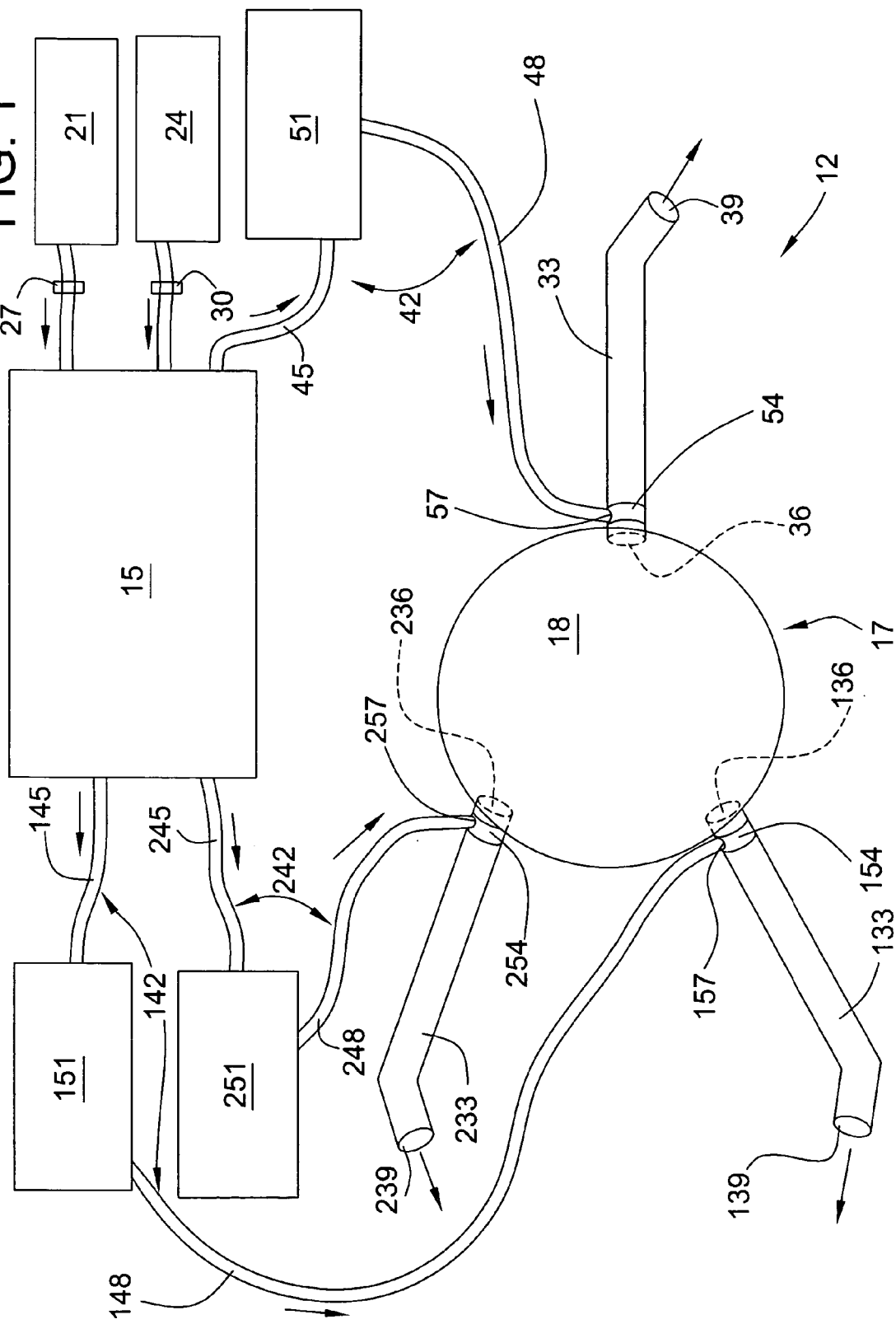
FIG. 1 shows a schematic plan view of one embodiment of a system for preparing a heat resistant accelerant slurry and adding the accelerant slurry to a post-mixer aqueous dispersion of calcined gypsum.

While the invention is susceptible to various modifications and alternative constructions, certain illustrative embodiments thereof have been shown in the drawings and will be described below in detail. It should be understood, however, that there is no intention to limit the invention to the specific embodiments disclosed, but on the contrary, the intention is to cover all modifications, alternative constructions, and equivalents falling within the spirit and scope of the invention as defined by the appended claims.

DETAILED DESCRIPTION OF THE INVENTION

The present invention is premised, at least in part, on the surprising discovery that the problems associated with use of heat resistant accelerator (HRA) can be minimized by forming a HRA slurry and then adding the slurry to an aqueous dispersion of calcined gypsum. Preferably, the HRA slurry is added to the aqueous dispersion after it has left a stucco mixer, for example, a pin, multipass, or other conventional mixer. Advantageously, the discharge apparatus according to the invention does not require a separate power source in order to mix the high viscosity production additive with the aqueous dispersion of calcined gypsum as the dispersion passes from the stucco mixer through the discharge apparatus.

In accordance with the present invention, FIG. 1 shows a system 12 for preparing a heat resistant accelerant (HRA) slurry and adding it to a post-mixer aqueous dispersion of calcined gypsum. The system comprises a first mixing device 15 for preparing the HRA slurry, and a second mixing device 17, for example, a stucco mixer such as a pin mixer, multipass mixer, pinless mixer, or other mixer that can be used to prepare aqueous gypsum dispersions, with interior 18 for preparing the aqueous dispersion of calcined gypsum. Operatively associated with the first mixing device 15 are a HRA source 21 and liquid medium source 24. Control meters 27, 30 can be further operatively associated with the sources 21, 24, for controling the flow of HRA and liquid medium into the first mixing device 15. The positioning of the control meters, 27, 30, can be varied, and can be configured in any position that allows for metering of the source materials.

The HRA slurry formed in the first mixing device 15 is operatively connected to a discharge apparatus 33, which is operatively associated with a mixer outlet 36, and terminating in an outlet 39. In some embodiments, the outlet comprises a boot. A boot is appropriate for use on the discharge apparatus used for depositing of the main field slurry—as opposed to the densified layer slurry. In other embodiments, the outlet is provided as a conduit such as hose. A conduit or hose outlet is appropriate for a densified layer discharge apparatus.

The first mixing device 15 can be operatively associated with the discharge device 33 via a transfer line 42, which can have a plurality of subsections, for example, 45, 48. A delivery device 51 can be operatively associated with the first mixing device 15 and discharge apparatus 33 so as to permit flow of HRA slurry. In some embodiments, the delivery device 51 is a pump, for example, a positive displacement pump. Appropriate pumps for use in the systems of the invention are discussed in more detail in relation to the methods of the invention. While the system 12 need only comprise a single discharge apparatus 33, as is shown in FIG. 1, the system 12 can also comprise one or more additional discharge apparatus, for example, 133, 233, operatively associated with second and third mixer outlets 136, 236, and can terminate at 139, 239. The second and third discharge apparatuses, 133, 233, can be operatively associated with the first mixing device 15 with transfer lines 142 with, for example, subsections 145, 148, 242, with, for example, subsections 245, 248), and can further incorporate delivery devices 151, 251, in a manner analogous to that described for the operative association of the first mixing device 15 with the discharge apparatus 33.

As described above, the system 12 is configured so that the HRA slurry can be transferred from the first mixing device 15 to the discharge apparatus 33. The discharge apparatus can comprise an injection ring 54 comprising at least one injection port 57. Any additional discharge apparatuses provided in the subsystem 12, for example, 133, 233, can further comprise injection rings, for example, 154, 254, and ports, for example, 157, 257. A more detailed discussion of the injection ring 54, injection port 57, and associated elements is provided below in respect to FIGS. 3 and 4. While injection rings are discussed in the context of both systems and methods of the present invention, other means of injection can be employed in addition or in the alternative to an injection ring. For example, in some embodiments, a needle on a transfer line can be used for transfer into the discharge apparatus. In some embodiments, a nipple is provided in the discharge apparatus to allow transfer into the apparatus.

Figure 2:
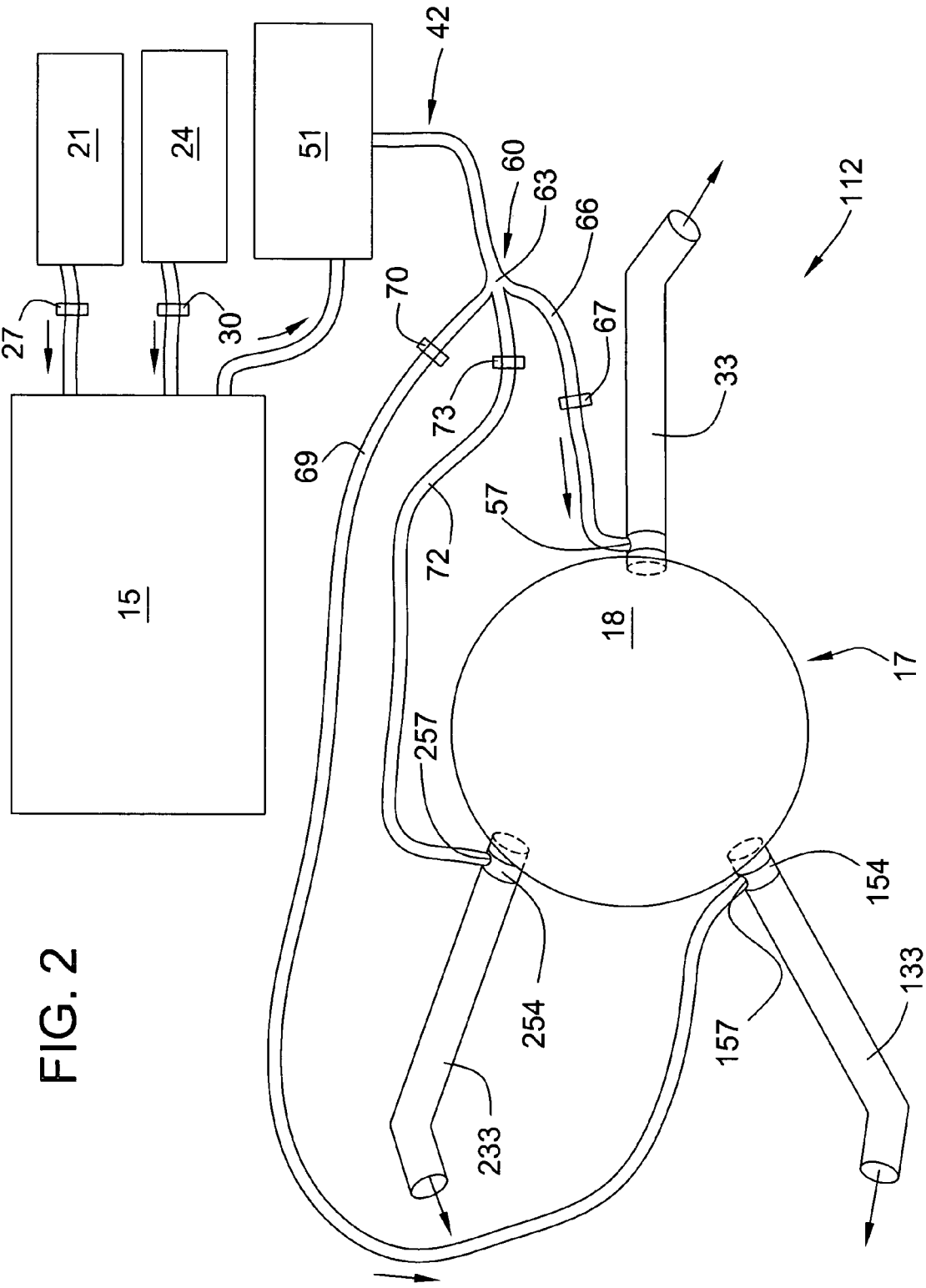
FIG. 2 shows a schematic plan view of another embodiment of a system for preparing a heat resistant accelerant slurry and adding the accelerant slurry to a post-mixer aqueous dispersion of calcined gypsum.

FIG. 2 shows a system 112, which is a variation on the system 12 of FIG. 1. System 112 can comprise a delivery device 51 to assist in the transfer of HRA slurry into multiple discharge apparatuses, for example, 33, 133, 233. Use of the delivery device 51 as a common delivery device can be accomplished by branching the transfer line 42 using an udder, manifold, or other device with branching capability 60 that branches at 63 to provide multiple branch lines, for example, 66, 69, and 72. The branches lines and/or udder, manifold, or other device with branching capability can incorporate control valves or like devices, for example, 67, 70, and 73, to control the flow of HRA slurry through the branch lines, for example, 66, 69, and 72, such valves can also or in the alternative be associated with the branching device 60. These branch lines can be connected to the discharge apparatuses 33, 133, 233, via injection rings, for example, 54, 154, 254, and injection ports, 57, 157, 257, in a manner analogous to that described above for system 12.

Figure 3:
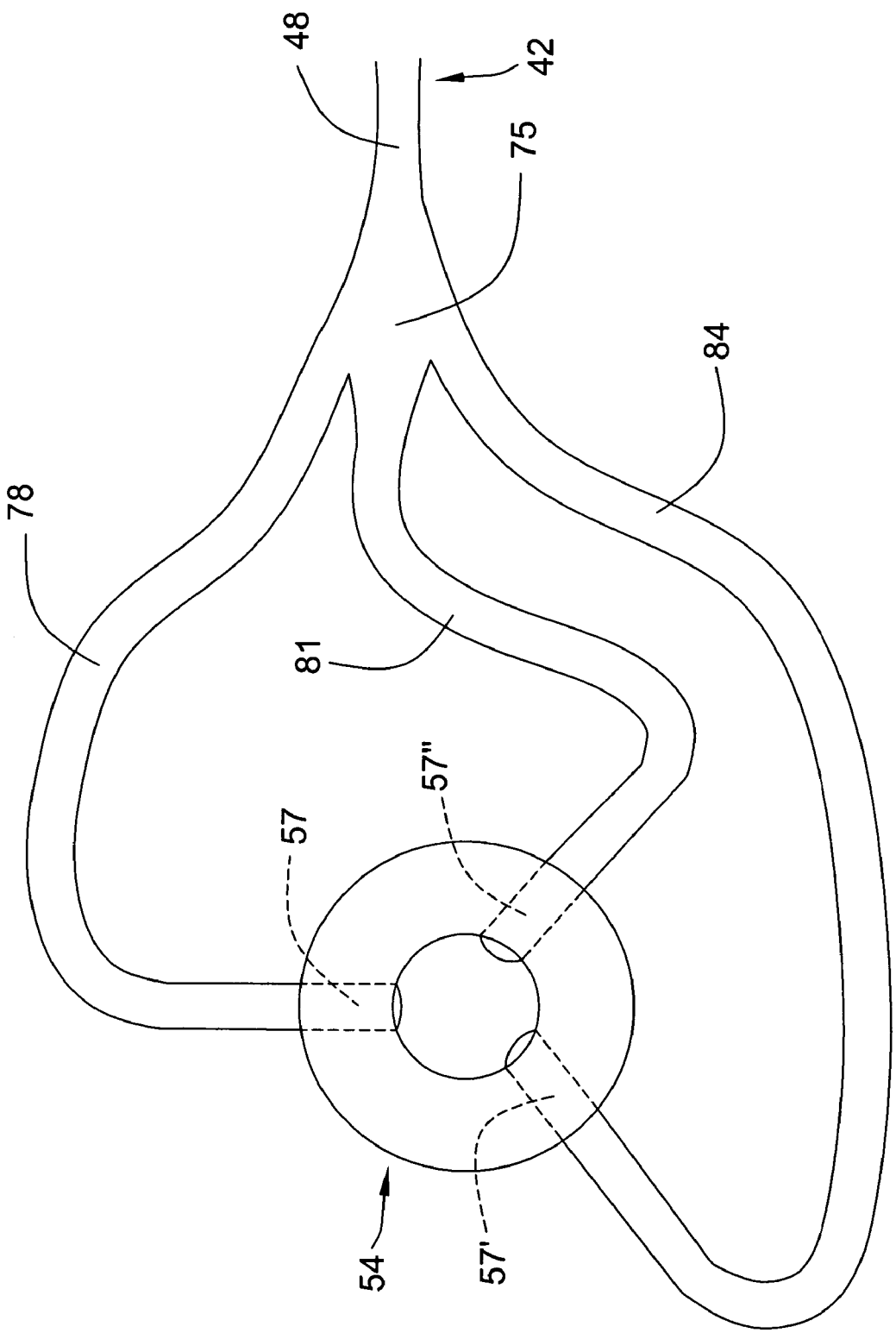
FIG. 3 shows a schematic cross-sectional view of one embodiment of a heat resistant slurry injection subsystem.

FIG. 3 shows an embodiment in which the transfer line 42 comprises an udder, manifold, or other device with branching capability 75 that splits the transfer line 42 into a plurality of branch lines 78, 81, and 84. Three branch lines are shown for illustrative purposes only. The injection ring 54 of FIG. 3 is shown with a plurality of injection ports 57, 57', and 57", but again that number is shown for illustrative purposes only. The branch lines 78, 81, and 84 are feed into injection ports 57, 57", and 57' respectively. In some embodiments, additional injection rings, for example, 154, 254, as depicted in FIG. 1, can also incorporate the aforementioned features.

Figure 4:
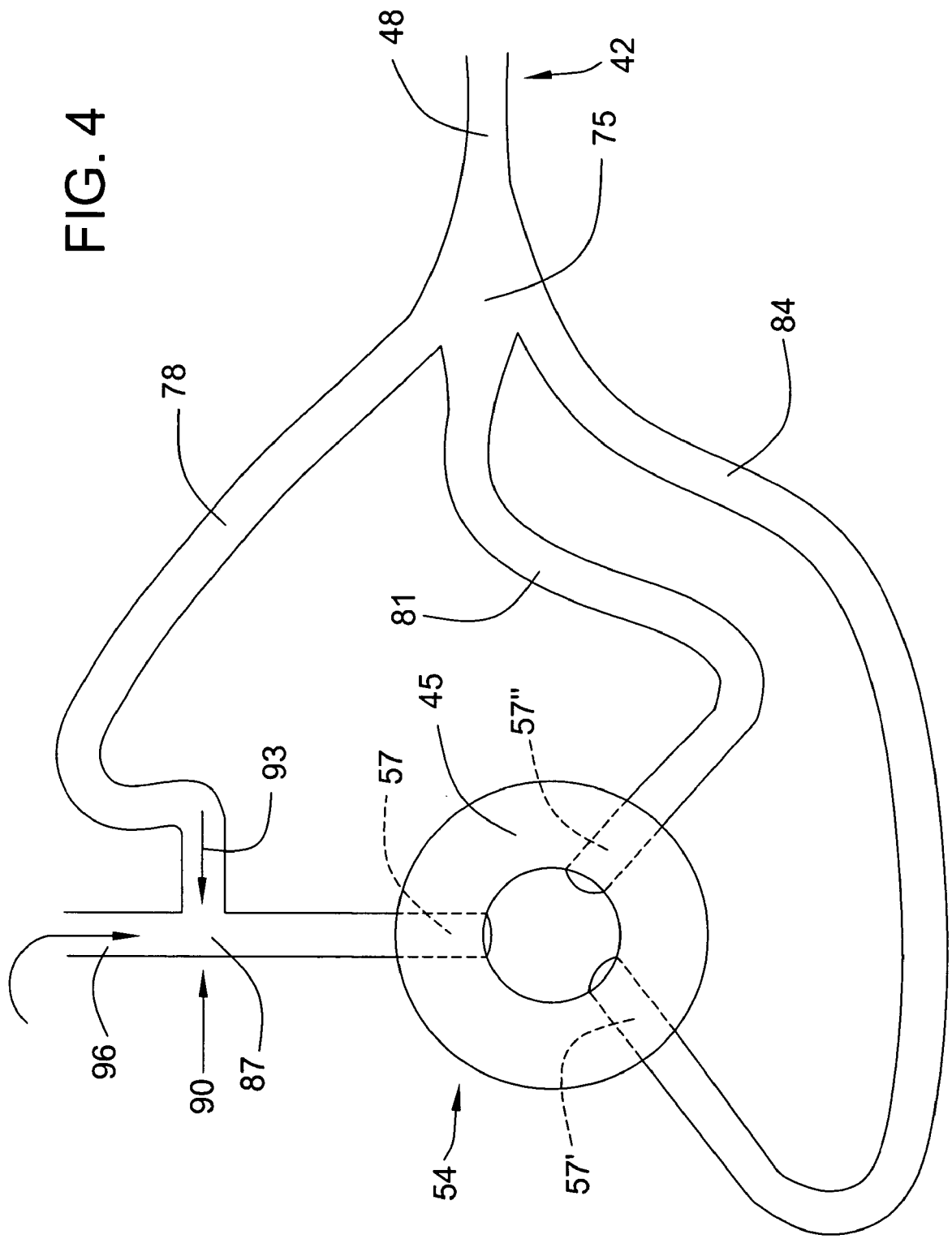
FIG. 4 shows a schematic cross-sectional view of another embodiment of a heat resistant slurry injection subsystem.

FIG. 4 shows a variation on the embodiment shown in FIG. 3, which incorporates a tee 87 that allows mixing of two or more production additives prior to injection into the discharge apparatus 33. The tee 87 comprises a junction 90 at which HRA slurry and a second additive converge from inlets 93, 96, respectively. While FIG. 4, only shows a tee 85 for one of the injection ports 57 that is for illustrative purposes only. Any number of the injection ports can have a tee 87 associated with them.

Figure 5:
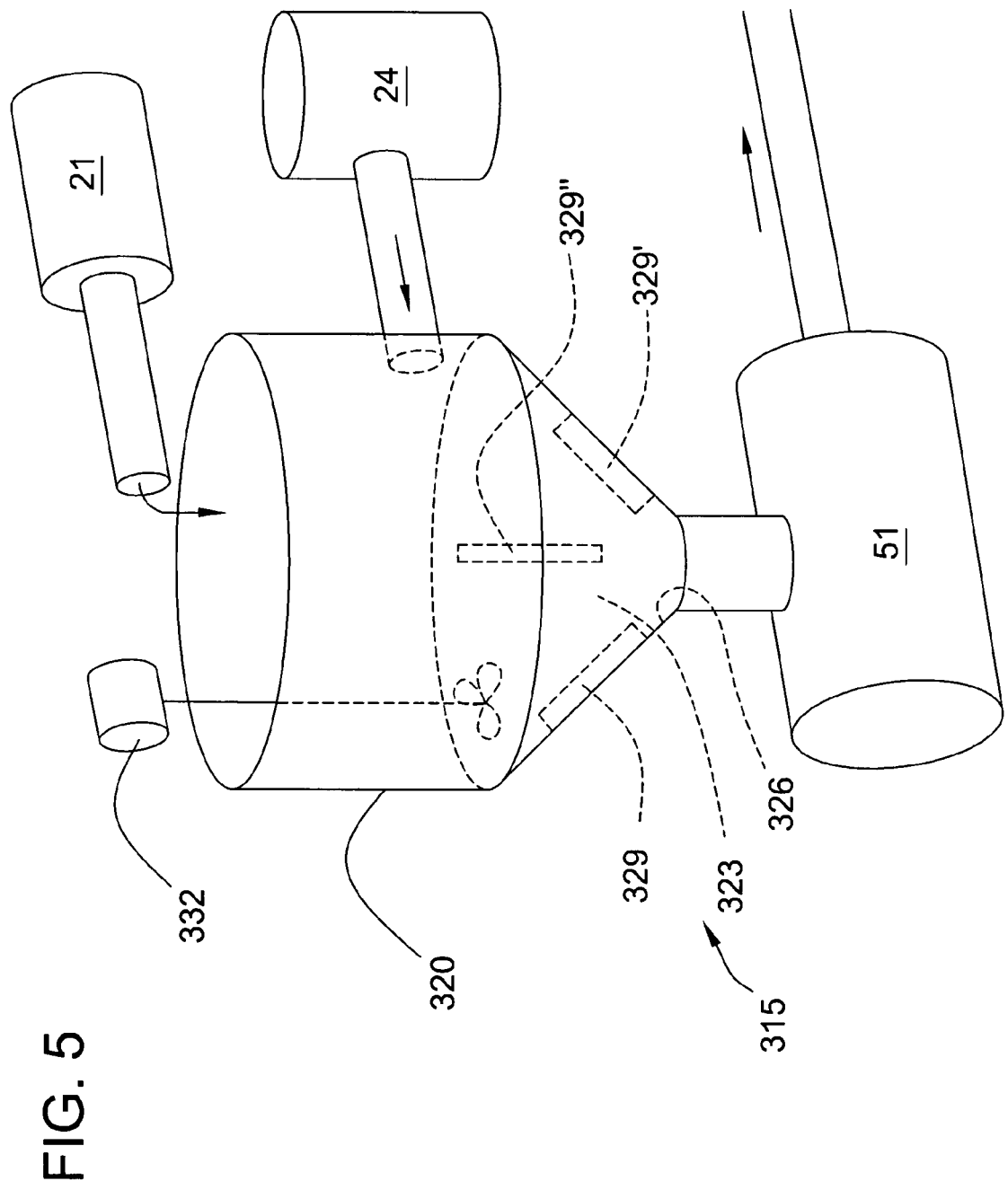
FIG. 5 shows a partial perspective view of one embodiment of a heat resistant slurry subsystem.

FIG. 5 shows a HRA mixing subsystem 315, which is an example of a form that the first mixing device can take. The HRA mixing subsystem 315 can be incorporated into the systems, for example, 12 and 112, and utilized in the methods of the invention. The HRA mixing subsystem 315 comprises a bottom discharge tank 320. The bottom discharge tank 320 comprises an interior 323 and an interior perimeter 326. One or more baffles, for example, 329, 329', 329", can be arrayed about the interior perimeter 326. HRA and liquid medium sources, 21, 24, are operatively associated with the bottom discharge tank 320. The HRA subsystem also can comprise an agitator 332 positioned so as to facilitate mixing of the HRA and liquid medium. While agitator 332 is shown as a motor/propeller type device, that is for illustrative purposes only as the agitator can take on a number of different forms provided that a particular form facilitates mixing. Examples of suitable mixer/agitator devices and methods also include static mixers, spraying the liquid medium at the HRA, and a rotating cement mixer type mixer that can also comprise baffles. In some embodiments an approximately 1750 rpm motor is used to spin the propeller for the agitator. The cylindrical/frustoconical representation of the bottom discharge tank as shown in FIG. 5 is for illustrative purposes only, as it can take on a number of different shapes. The bottom discharge tank 320 is operatively associated with a discharge apparatus, for example, 33, 133, and 233 as shown in FIGS. 1 and 2. A delivery device 51, for example, a pump, can be provided to assist in the transfer of the HRA slurry from the bottom discharge tank 320 and the discharge apparatus 33. An example of such a pump is a progressive cavity pump from Moyno.

Figure 6:
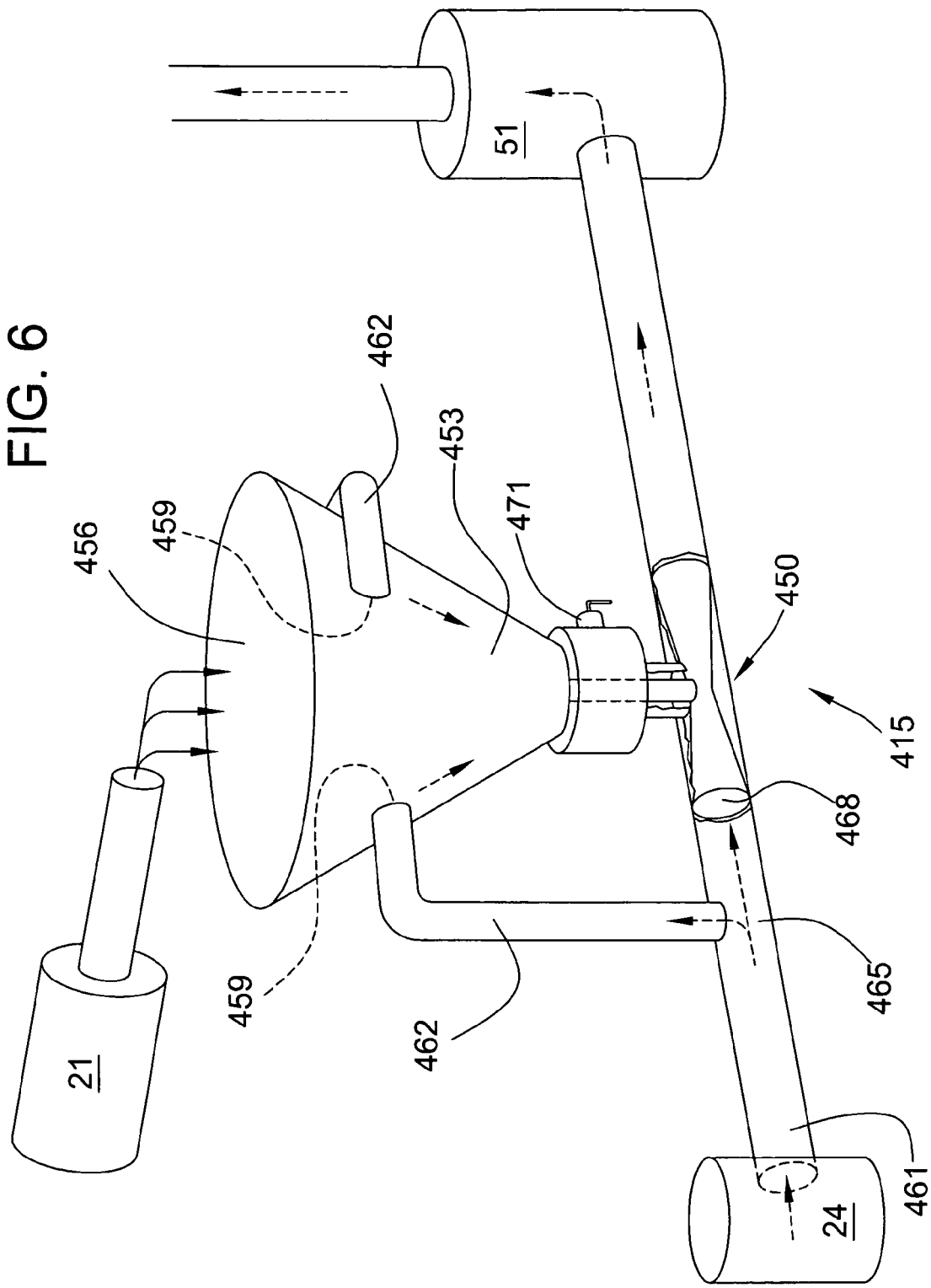
FIG. 6 shows a partial perspective view of another embodiment of a heat resistant slurry subsystem.

FIG. 6 shows an HRA eductor subsystem 415, which is an example of a form that the first mixing device can take. The HRA eductor subsystem 415 is operatively associated with HRA and liquid medium sources, 21 and 24 respectively. The eductor subsystem 415 comprises an eductor 450 and an entrance chamber 453. The entrance chamber 453 comprises an entrance 456 to allow insertion of the HRA from the source 21. The entrance chamber 453 can also include one or more inlet ports 459 for insertion of the liquid medium from the source 24 via a source line 461 and liquid medium entrance line 462. In addition or in the alternative to the liquid medium entering the entrance chamber 453 through the inlet port 459, the source line 461 can branch at 465 to enter the eductor 450 at 468. In the absence of the entrance line 462, a branch at 465 is not necessary. A valve 471 can be incorporated into the HRA eductor subsystem 415 between the entrance chamber 453 and the eductor 450. A delivery device 51 can be provided to facilitate transfer of the HRA slurry to the discharge apparatus 33. Any type of eductor can be used in the present invention. In some embodiments, an inductor is substituted for the eductor. Examples of suitable eductors and inductors are available from Fox Valve (Dover, N.J.).

Figure 7:
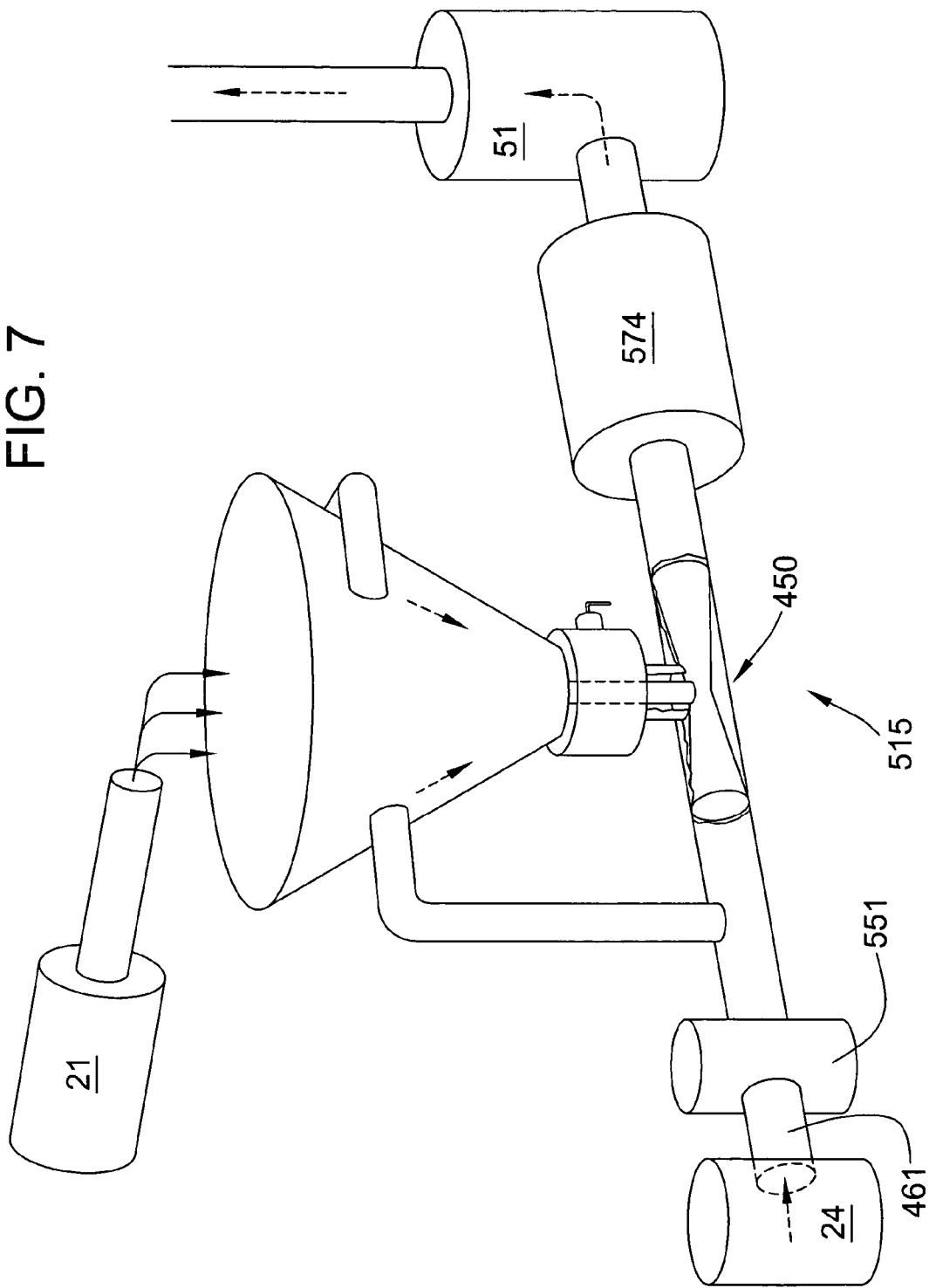
FIG. 7 shows a partial perspective view of still another embodiment of a heat resistant slurry subsystem.

FIG. 7 shows a HRA eductor subsystem 515, which is a variation on the subsystem 415 shown in FIG. 6. The subsystem 515 can generally have the same attributes as those described for the subsystem 415. The subsystem 515 comprises some additional elements. A source pump 551 is operatively associated between the eductor 450 and liquid medium source 24. A holding tank 574 is operatively associated between the eductor 450 and the delivery device 51. The holding tank 574 allows for positioning of the source pump 551 so the eductor will properly function based on the Venturi principle given the back pressure the HRA slurry can experience when entering the discharge apparatus 33.

Figure 8:
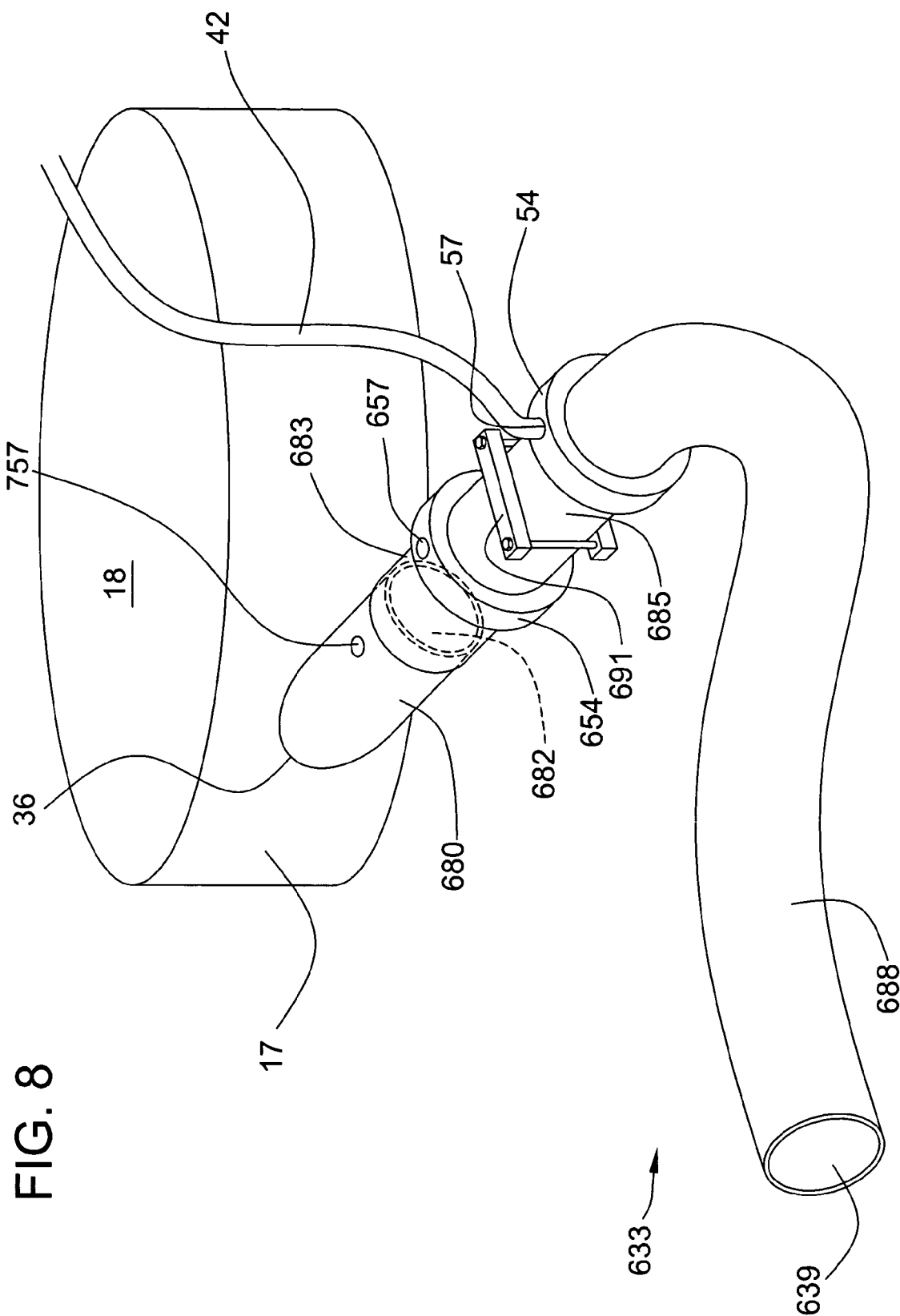
FIG. 8 shows a partial perspective view of a mixer and discharge apparatus.

FIG. 8 shows a discharge apparatus 633, which is one embodiment for the discharge apparatus 33, 133, 233, etc. The discharge apparatus 633 also displays a number of different elements and attributes that can be shared with a discharge apparatus generally. The discharge apparatus comprises a gate 680 with gate opening 682, a series of hose sections 683, 685 and 688, a cage valve 691, and two injection rings 54, 654 with injection ports 57, 657, and an outlet 639. The gate 680 acts as an adapter operatively associated with both the second mixing device and the discharge apparatus that allows the discharge apparatus' conduit to attach to the second mixing device 17 at the mixer outlet 36. The gate 680 is shown with an injection port 757. The injection ports 57, 657, and 757 are examples of possible locations for entry of HRA, foam, or other production additive. Other additives, such as sodium trimetaphosphate and other phosphates, that can be used include those described in U.S. patent application Ser. No. 11/116,809. The rings 54, 654 and gate 680 can be configured to have multiple injection ports, for example, as illustrated in FIGS. 3 and 4. In some embodiments, the hose section 685 separating the rings 54, 654 is about 15 to about 16 inches long. The transfer line 42 or other transfer lines can be connected at any of the injection ports. The positioning of the cage valve 691 can be varied along the length of the discharge conduit 633 and allow for control of flow in the discharge conduit. The discharge apparatuses and systems of the invention can incorporate elements and subsystems as described in co-owned U.S. Pat. No. 6,494,609.

The methods of the invention comprise the formation of a HRA slurry from HRA and a liquid medium. The HRA slurry formation can also comprise additional ingredients. The liquid medium generally comprises at least water. Additional ingredients can be added together with one or both of the HRA and liquid medium source streams. Additional ingredients can also be added in other streams, either alone or in combination with one another.

HRAs are generally known in the art, and any appropriate HRA can be utilized in the slurry formation of the present invention. Suitable HRAs and methods of producing the same are described, for example, in U.S. Pat. No. 3,573,947. HRA can be produced using a ball mill or other suitable grinding device by grinding calcium sulfate dihydrate in a substantially dry state. Preferably, the calcium sulfate is ground to achieve smallest particle size while maintaining a large overall surface area, but not so small that the slurry to be formed would have undesirable properties, for example, excessive viscosity. HRAs for use in the present invention are also referred to as ball mill accelerators (BMAs) and coated accelerators (CAs). HRA for use in the present invention has a coating that aids in maintaining the effectiveness of the HRA when stored for extended periods of time. HRA coatings can comprise without limitation one or more of the following: sugars, including sucrose, dextrose and the like, starch, boric acid, and long chain fatty acids including salts thereof. While a heat resistant accelerator for use in the present invention preferably has heat resistant attributes, there is no requirement that the HRA pass any type of heat resistance test. HRA applicable to this invention also includes coated calcium sulfate dihydrate that has been subjected to one or more drying steps to improve the attributes of the accelerator. One example of such an accelerator is climate stabilized accelerator (CSA). Because aqueous solutions speed the degradation of HRA, additives can be included in the HRA slurry to help combat these problems. In some embodiments, organic phosphonates such as DEQUEST® phosphonates commercially available from Solutia, Inc., St. Louis, Mo., are utilized. Examples of DEQUEST® phosphonates include DEQUEST® 2000, DEQUEST® 2006, DEQUEST® 2016, DEQUEST® 2054, DEQUEST® 2060S, DEQUEST® 2066A, and the like. In some embodiments, addition of one or more phosphorous containing compounds such as phosphates and preferably sodium trimetaphopshate can also be employed. Methods of preserving the efficacy of the HRA slurry also include the use of a gypsum solution including calcium sulfate dihydrate, and preferably a saturated calcium sulfate dihydrate solution. One of skill in the gypsum art will be able to identify the appropriate type of HRA for a given gypsum application based on the teachings of the present invention and the knowledge available in the art.

The methods of the present invention can utilize one or more systems, subsystems, and elements as described herein, for example, as described in respect to the figures. However, the methods can employ various other systems, subsystems, and elements. While the methods are described in relation to such systems, subsystems, and elements, such description is provided to assist the reader in appreciating the invention, and not to limit the invention as set forth in the appended claims. Moreover, one or more additional accelerators can be used. Examples of such accelerators include potash, wet gypsum accelerator (WGA), climate stabilized accelerator (CSA), and any accelerator known in the gypsum art. In those embodiments where one or more additional accelerators are employed, the additional accelerant can be added in the aqueous dispersion of calcined gypsum mixer or outside of that mixer, that is, in the discharge apparatus. In some embodiments, potash, in granule and/or powder form, is used as an additional accelerator.

According to one aspect of the invention HRA and liquid medium are introduced into the first mixing device 15 from sources 21 and 24 respectively, the rate, volume, and other parameters of which can be controlled using meters 27 and 30 respectively. In some embodiments, the introduction of the HRA and liquid medium to the first mixing device comprises separately metering of the HRA and liquid medium. In some embodiments, the addition of the HRA and liquid medium to the first mixing device is continuous. In some embodiments, a feed system and method similar to that described in U.S. Pat. No. 3,262,799 is utilized. A method of preparing a heat resistant accelerant slurry and introducing it into a post-mixer aqueous dispersion of calcined gypsum in a discharge apparatus, in accordance with the present invention comprises introducing a heat resistant accelerator (HRA) into a first mixing device; adding a liquid medium into the first mixing device; mixing the HRA and liquid medium in the first mixing device to form the HRA slurry; forming the aqueous dispersion of calcined gypsum in a second mixing device; discharging the aqueous dispersion from the second mixing device into a discharge apparatus; transferring the HRA slurry from the first mixing device into the discharge apparatus. In some embodiments, the HRA and liquid medium are separately introduced into the first mixing device. In some embodiments, the liquid medium comprises water. In some embodiments, the liquid medium comprises phosphate. In some embodiments, the liquid medium comprises a gypsum solution, including calcium sulfate dihydrate, and the gypsum solution can be saturated.

In some embodiments, the method of HRA slurry preparation comprises disrupting vortex formation in the first mixing device, for example, when the mixing device comprises a bottom discharge tank. The disruption can be achieved using a plurality of baffles arrayed around an interior perimeter of the first mixing device.

In some embodiments, the transferring step of the method comprises pumping the HRA slurry into the discharge apparatus. In some embodiments, the pumping comprises the use of a positive displacement pump.

In some embodiments, a substantial percentage of an added amount of HRA and an added amount of liquid medium is retained in the first mixing device less than less than 24 hours, less than 18 hours, less than 12 hours, less than 6 hours, less than three hours, less than two hours, less than one hour, less than 30 minutes, less than 25 minutes, less than 20 minutes, 15 minutes, less than 10 minutes, and/or less than 5 minutes. In some embodiments, the substantial percentage of the added amounts is greater than 99%, 98%, 97%, 96%, 95%, 90%, 85%, 80%, 75%, and/or 50%. In general, the time between formation of the HRA slurry and its introduction into the discharge apparatus is minimized so as to minimize the degradation of the HRA. One of skill in the art will understand that even in a first in, first out type device, such a bottom discharge tank, a certain percentage of the "first in" can persist in the device due to mixing or other disruption.

In some embodiments, the HRA slurry is formed with a percent solids of between about 30% and about 60% percent solids. In some embodiments, the HRA slurry is formed with a percent solids of between about 40% and about 50% percent solids, which allows for the HRA slurry to be easily pumped by means of a progressive cavity pump. The higher the percent solids HRA the lower amount of slurry that needs to be pumped into the gypsum slurry to achieve the required set time at the knife. This set time can vary depending on the type of gypsum rock being used by a plant, the calcination ratio of the converted gypsum dehydrate to stucco, the water stucco ratio of the slurry, the line speed/distance to the knife at a given plant, the efficiency of the HRA prior to being made into a slurry and a number of other variables particular to each plant. Because board line speeds can vary and the distance from the knife can vary greatly, set times from the mixer to knife can vary as well. Therefore accelerator usage to set the board at the knife can vary over a wide range. One of skill in the art will appreciate the amount of accelerator used can be tailored to individual plants and production lines on a case by case basis.

A method in accordance with the present invention comprises delivering a HRA slurry from a first mixing device 15 to a discharge apparatus 33 where the slurry is introduced into an aqueous dispersion of calcined gypsum that has been discharged from a second mixing device, for example, a stucco mixer such as a pin mixer, multipass mixer, pinless mixer, and other mixers that can be used to prepare gypsum dispersions, wherein the aqueous dispersion had been mixed. While gravity transfer is contemplated, the HRA slurry can be moved from the first mixing device 15 to the discharge apparatus 33 with the assistance of one or more delivery devices, for example, a pump. In some embodiments, the pump is a positive displacement pump, but other pump types can be used in addition or in the alternative can be employed, for example, a centrifugal pump. Examples of suitable positive deplacement pumps include progressive cavity, gear, and peristaltic pumps. The pressure of the HRA slurry in the transfer line 42 between the first mixing device 15 and discharge apparatus 33 can be measured, using a pressure gauge. However, use of such a gauge is not necessary if the pump employed is self-regulating. The pressure of the slurry entering the discharge apparatus should be maintained at a pressure greater than that of the contents of the discharge apparatus so as to minimize back pressure and allow efficient transfer of the HRA slurry. In some embodiments, the pressure in the discharge apparatus is between about 5 and about 15 p.s.i. Pressure gauges can be incorporated into the systems and used in the methods of the present invention in a manner analogous to that described in U.S. patent application Ser. No. 11/116,809. The HRA slurry can be discharged into the discharge apparatus 33 through an injection port 57, which can be associated with an injection ring 54. In some embodiments, the HRA slurry is split into multiple branches to allow for multiple entries into the discharge apparatus 33. Such multiple entries can be achieved by providing multiple inlets, for example, 57, 57', and 57" in the injection ring 54. In some embodiments, the HRA slurry is combined with one or more additional additives, for example, foam, before being introduced into the aqueous dispersion of the discharge apparatus 33. Such combining can be accomplished using a tee 90 providing for entry of HRA slurry 93 and another additive 96. In some embodiments, the HRA slurry and one or more additional additives are combined approximately three inches from the point of injection into the discharge apparatus. In some embodiments, the HRA is transferred into the discharge apparatus downstream of a pinch valve operatively associated with the discharge apparatus. In some embodiments, a dispersant is added to the discharge apparatus such as lignin, naphthalene sulfate or other suitable dispersant.

For a particular gypsum product, multiple discharge apparatuses can be used. For example, if the intended product is a wallboard and top and bottom densified layers are desired, second and third discharge apparatuses, that is, densified layer extractors 133, 233 can be provided. For certain wallboard products as well other board products such as ceiling tile, see co-owned, co-pending U.S. patent application Ser. No. 10/804,359, only a single densified layer is applied. In some embodiments a separate delivery devices 51, 151, and 251 are utilized for transfer of the HRA slurry from the first mixing device 15 to the discharge apparatuses 30, 133, and 233. In other embodiments, there is a single delivery device 30 for transfer of the HRA slurry to all three discharge apparatuses. In still other embodiments, a delivery device 51 is used for the discharge apparatus 33, and a delivery device 151 is used for the discharge apparatuses 133 and 233. Regardless of the number or presence of delivery devices, the HRA slurry can split into branch transfer lines using an udder, tee, manifold, or other device allowing branching of the transfer line. Control of HRA slurry flow into particular branch lines can be controlled using a valve or other element of like function.

HRA slurry is generally introduced to the post-mixer aqueous dispersion in a stream perpendicular to the flow of the dispersion in the discharge apparatus. However, other orientations of HRA slurry introduction are also possible. For ideal incorporation into the aqueous dispersion, the HRA slurry is introduced into the discharge apparatus closer or close as possible to the mixer outlet 36 than the discharge outlet 39. In some embodiments, the introduction occurs from about 2.5 inches to 3 inches from the mixer outlet 36. In some embodiments, the introduction occurs about 1 inch from the mixer outlet. Generally, moving the introduction of the HRA slurry downstream in the discharge apparatus will serve to delay setting acceleration.

When using the present methods to make a wallboard product with first, for example, bottom, and second, for example, top, densified layers, each densified layer discharge apparatus 133, 233 can comprise and/or be operatively associated with one or more of the following: a hose and a ring, for example, 154, 254. The percentage of HRA slurry to provide a proper set is dependent on the amount of aqueous slurry that is being applied to the densified layer layer of the board. For example, if 10% of the main gypsum slurry, aqueous dispersion from the second mixing device 17, is being applied to the first, for example, bottom, densified layer, then preferably approximately 10% of the HRA is directed to the bottom densified layer through the bottom discharge apparatus 133. If a second, for example, top, densified layer is being utilized, the proportion of HRA slurry would again preferably approximately match the percentage of gypsum slurry being applied to the top densified layer. Percentages of gypsum slurry from the second mixing device 17 generally range from about 5% to about 20%. The terms top and bottom, as well as face and back and other equivalent terms, are relative terms in respect to which orientation of the gypsum product one is referring to. For purposes of illustration only, bottom refers to a first paper, that is, cover sheet that travels beneath the gypsum mixer and the densified layer that is applied to that first paper. Top refers to a second paper that is applied after addition of the gypsum slurry through the main discharge apparatus 33 to the bottom paper, as well as the densified layer applied to the second paper.

In some embodiments, the first mixing device 15 comprises a bottom discharge mixing tank, and the mixing step comprises use of the mixing tank. In such embodiments, the bottom discharge mixing tank further comprises an agitator, and the mixing step can comprise agitation of the HRA and liquid medium. An example of bottom discharge tank 320 is illustrated in FIG. 5 and discussed herein.

In some embodiments, the method utilizes an eductor as the first mixing device, and the mixing step comprises use of the eductor. Exemplary eductor subsystems 415, 515, can be used and are illustrated in FIGS. 6 and 7, respectively. When the method uses an eductor 450, and a pump as a delivery device 551 upstream of the eductor, the HRA slurry formed is transferred initially to a holding tank 574 and then pumped with a delivery device 51 to the discharge apparatus 33. By using the holding tank, proper pressure is retained for the eductor 450 to operate correctly. Any of the methods described herein can also involve a holding tank 574 for HRA slurry, provided that the time that the HRA slurry spends in the tank is minimized. In some embodiments, the HRA slurry is kept in the tank less than about 10 minutes.

The systems and method of the present invention have the benefit of delaying setting of an aqueous dispersion of calcined gypsum by delaying the introduction of HRA slurry until after the dispersion has left the stucco mixer, that is, the second mixing device, 17. In some embodiments, the methods allow for addition of less water to the stucco mixer resulting in a lower water-stucco ratio, because setting in the mixer because of absence of accelerator in the second mixing device interior 18. Methods and systems are also contemplated for introducing the HRA slurry once formed directly into the second mixing device 17 instead of or in addition to introduction into the discharge apparatus.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention, especially in the context of the following claims, are to be construed to cover both the singular and the plural, unless otherwise indicated herein or clearly contradicted by context. The terms "comprising," "having," "including," and "containing" are to be construed as open-ended terms, that is, meaning "including, but not limited to," unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language, for example, "such as", provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a heat resistant accelerant slurry and introducing the slurry into a post-mixer aqueous dispersion of calcined gypsum in a discharge apparatus, the method comprising:
   introducing a dry-milled heat resistant accelerator (HRA) into a first mixing device, wherein the HRA comprises a coating selected from the group consisting of sugar, starch, boric acid, a long chain fatty acid, and a salt of a long chain fatty acid;
   adding a liquid medium into the first mixing device;
   mixing the dry-milled HRA and liquid medium in the first mixing device to form the HRA slurry;
   forming the aqueous dispersion of calcined gypsum in a second mixing device;
   discharging the aqueous dispersion from the second mixing device into a discharge apparatus;
   transferring the HRA slurry from the first mixing device into the discharge apparatus,
   wherein the HRA slurry does not contain an organic phosphonate or phosphate.

2. The method of claim 1, wherein the dry-milled HRA and liquid medium are separately introduced into the first mixing device.

3. The method of claim 1, wherein the liquid medium comprises water.

4. The method of claim 1, wherein the dry-milled HRA comprises calcium sulfate dihydrate.

5. The method of claim 4, wherein the HRA slurry is a saturated solution.

6. The method of claim 1, the method further comprising: disrupting vortex formation in the first mixing device.

7. The method of claim 6, wherein the disrupting is achieved using a plurality of baffles arrayed around an interior perimeter of the first mixing device.

8. The method of claim 1, wherein the transferring step comprises pumping the HRA slurry into the discharge apparatus.

9. The method of claim 8, wherein the pumping comprises the use of a positive displacement pump.

10. The method of claim 1, wherein the introduction of the dry milled HRA and liquid medium to the first mixing device comprises separately measuring the dry milled HRA and liquid medium.

11. The method of claim 1, wherein the addition of the dry milled HRA and liquid medium to the first mixing device is continuous.

12. The method of claim 1, wherein a substantial percentage of an added amount of dry milled HRA and an added amount of liquid medium is retained in the first mixing device less than 15 minutes.

13. The method of claim 1, wherein a substantial percentage of an added amount of dry milled HRA and an added amount of liquid medium is retained in the first mixing device less than 10 minutes.

14. The method of claim 1, wherein a substantial percentage of an added amount of dry milled HRA and an added amount of liquid medium is retained in the first mixing device less than 5 minutes.

15. The method of claim 13, wherein the substantial percentage is greater than 99%.

16. The method of claim 13, wherein the substantial percentage is greater than 95%.

17. The method of claim 13, wherein the substantial percentage is greater than 90%.

18. The method of claim 13, wherein the substantial percentage is greater than 75%.

19. The method of claim 1, the method further comprising discharging the aqueous dispersion into a second discharge apparatus.

20. The method of claim 1, wherein the HRA slurry is mixed with foam prior to entry into the discharge apparatus.

21. The method of claim 1, the transferring comprising pumping with a plurality of pumps, wherein there is a pump for each discharge apparatus to which the HRA slurry is being pumped.

22. The method of claim 1, wherein the transferring comprises the utilization of at least one device selected from the group consisting of an udder, a manifold, a tee, a valve and a hose to distribute HRA slurry to multiple discharge apparatuses.

23. The method of claim 1, wherein the percent solids of the HRA slurry formed is between about 30% and about 60% percent solids.

24. The method of claim 1, wherein the percent solids of the HRA slurry formed is between about 40% and about 50% percent solids.

25. The method of claim 1, wherein the first mixing device comprises a bottom discharge mixing tank, and the mixing step comprises use of the mixing tank.

26. The method of claim 25, wherein the bottom discharge mixing tank further comprises an agitator, and the mixing step comprises agitation of the dry milled HRA and liquid medium.

27. The method of claim 1, wherein the first mixing device comprises an eductor, and the mixing step comprises use of the eductor.

28. The method of claim 27, wherein the transferring step comprises transferring the HRA slurry into a holding tank before transfer to the discharge apparatus.

29. The method of claim 1, wherein the dry milled HRA is introduced substantially perpendicular to the discharge apparatus.

30. The method of claim 1, further comprising:
   discharging the contents of the discharge apparatus onto a moving cover sheet.

31. The method of claim 30, further comprising:
   applying a second cover sheet over the discharged contents.

32. The method of claim 31, further comprising:
drying the sheets and deposited contents.

33. A method of introducing a heat resistant accelerator (HRA) slurry into a post-mixer aqueous dispersion of calcined gypsum in a discharge apparatus, the method comprising:
discharging the aqueous dispersion from a mixing device into a discharge apparatus;
introducing the HRA slurry comprising a dry milled HRA with a coating selected from the group consisting of sugar, starch, boric acid, a long chain fatty acid, and a salt of a long chain fatty acid and a liquid medium into the discharge apparatus,
wherein the HRA slurry does not contain an organic phosphonate or phosphate.

34. The method of claim 1, wherein the coating is sugar.

35. The method of claim 34, wherein the sugar is sucrose or dextrose.

* * * * *